United States Patent [19]

Johnson

[11] 4,337,873
[45] Jul. 6, 1982

[54] FUEL CAP WITH POPPET TYPE VALVES

[75] Inventor: Lawrence P. Johnson, Huron, Ohio

[73] Assignee: General Motors Corporation, Detroit, Mich.

[21] Appl. No.: 207,390

[22] Filed: Nov. 17, 1980

[51] Int. Cl.³ ............................................. B65D 51/16
[52] U.S. Cl. ................... 220/204; 137/493.8; 220/209; 220/303; 220/DIG. 33
[58] Field of Search ............... 220/203, 204, 209, 303, 220/DIG. 33; 137/493.8

[56] References Cited

U.S. PATENT DOCUMENTS

| | | | |
|---|---|---|---|
| 2,649,776 | 8/1953 | Konchan | 220/203 X |
| 3,080,995 | 3/1963 | Palm | 220/203 X |
| 3,974,936 | 8/1976 | Gerdes | 220/204 |
| 4,165,816 | 8/1979 | Tupper | 220/303 |
| 4,299,102 | 11/1981 | Aro | 220/DIG. 33 |

FOREIGN PATENT DOCUMENTS

| | | | |
|---|---|---|---|
| 574143 | 4/1959 | Canada | 220/203 |
| 2756689 | 7/1978 | Fed. Rep. of Germany | 220/209 |

Primary Examiner—Allan N. Shoap
Attorney, Agent, or Firm—Donald F. Scherer

[57] ABSTRACT

A fuel cap has a pair of poppet type valves which control the pressure level within the fuel tank. Each valve member has a seat portion and a valve stem guide portion formed integral with the threaded closure member of the cap. A conical valve member having a longitudinally extending stem is positioned on the valve seat and in the stem guide by a spring member. The valve which controls the maximum pressure within the fuel tank is operable to permit very high gas flow rates.

4 Claims, 2 Drawing Figures

FUEL CAP WITH POPPET TYPE VALVES

This invention relates to fuel caps and more particularly to fuel caps for nonvented fuel tanks wherein valve members are operable to control the maximum and minimum pressures within the fuel tank.

It is an object of this invention to provide an improved threaded fuel cap having a pair of valve body structures, each including a valve seat portion and a valve guide portion integrally formed within the threaded portion of the fuel cap, and a pair of spring-loaded conical-shaped valve members cooperating with the valve body structures to control the maximum and minimum pressure levels within the fuel tank and for permitting high vapor flow rates from the fuel tank when necessary to prevent high pressure build-up within the fuel tank. dr This and other objects and advantages of the present invention will be more apparent from the following description and drawings in which:

Figure 1:
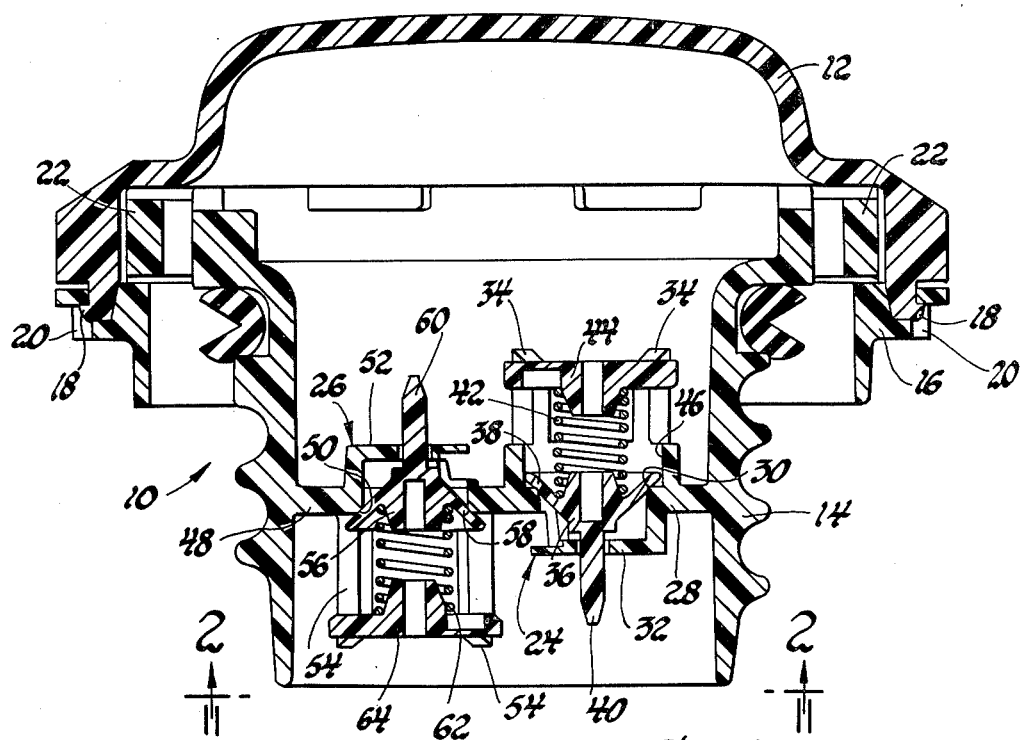
FIG. 1 is a cross-sectional view of a fuel cap incorporating the present invention.
Figure 2:
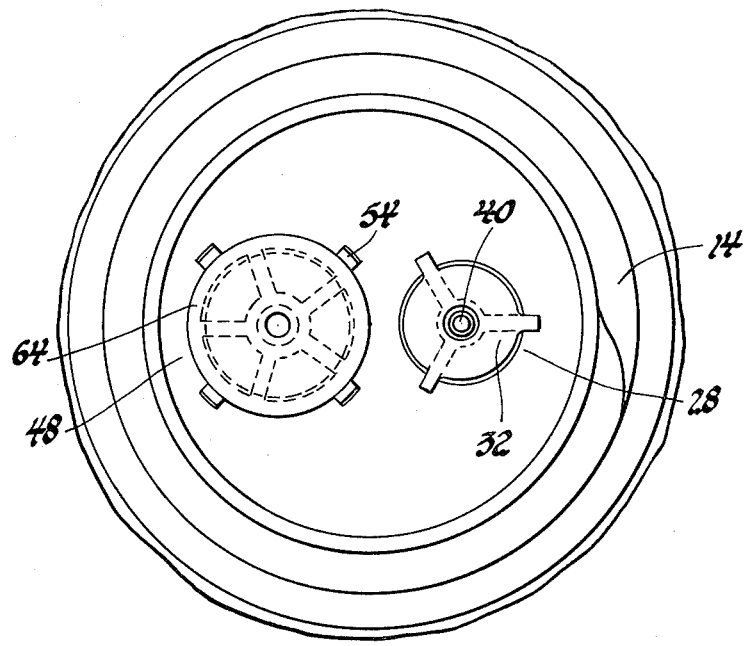
FIG. 2 is a view taken along line 2—2 of FIG. 1.

Referring to the drawing, it is seen in FIG. 1, a fuel cap 10, which includes a handle or cover member 12, a threaded closure member 14 and a skirt 16. The skirt 16 is secured to the handle 12 by a plurality of tabs 18, formed on the handle 12, which engage in slots 20 formed in the skirt 16. A more complete description of this tab and slot arrangement may be seen in U.S. Ser. No. 089,227, filed Oct. 29, 1979 and assigned to the same assignee. As an alternate structure, the handle 12 can be made of metal and crimped to retain the skirt 16.

The skirt 16 prevents the threaded member 14 from moving axially relative to handle 12 through abutment with a plurality of torque arms 22 formed integrally with the threaded portion 14. The torque arms 22 cooperate with cam surfaces, not shown, on the handle 12.

When the cap 10 is installed in a fuel fill tube, not shown, the torque arms 22 limit the closing torque or tightening torque which may be transmitted from handle 12 to threaded member 14. These types of torque limiting fuel caps are wellknown, such that a more complete description of their operation is not considered necessary, and those persons wishing a more detailed explanation are referred to U.S. Pat. No. 3,986,634, issued to Smith et al. Oct. 19, 1976.

The threaded portion 14 has incorporated therein, a pair of valve structures, generally designated 24 and 26. The valve structure 24 has a valve body portion 28 integrally formed with the threaded portion 14 and including a valve seat 30, a valve stem guide 32 and a plurality of retainer support members 34. A valve member 36 is disposed in the valve body 28 and includes a conical skirt portion 38 and a guide stem 40 which cooperate with the valve seat 30 and valve guide 32, respectively. The valve member 36 is urged into seating engagement with the valve seat 30 by a compression spring 42 which is retained between the conical portion 38 and a spring retainer 44. The spring retainer 44 is secured on and positioned by the retainer support member 34. The securing of spring retainer 44 may be accomplished by sonic welding, heat staking or other conventional securing means.

The valve body 28 has a cylindrical section 46 circumjacent the outermost surface of the conical portion 38 of valve member 36. The cylindrical portion 46 is open at the upper end between the retainer supports 34. When the pressure in the fuel tank exceeds the seating of spring 42, the valve member 36 will be lifted from valve seat 30.

The initial movement of the valve member 36 is within the cylindrical portion 46. The flow of vapor past the valve is maintained at a low level due to the pressure drop required. When a significant increase in pressure in the fuel tank is present, the valve member 36 will be moved sufficiently such that the conical portion 38 will be above the cylindrical portion 46, thereby providing a large flow path for the vapor from the tank. The conical skirt portion 38 is sufficiently flexible such that, upon seating, deflection thereof will occur resulting in wiping of the outer surface of skirt 38 against seat 30.

The valve 26 is similar to the valve 24 and includes a body portion 48 having a seat portion 50 and a valve stem guide 52. The valve body 48 also has a plurality of retainer support members 54. The valve 26 has a valve member 56 having a conical skirt portion 58 which sealingly engages the valve seat 50 and a stem portion 60 which is aligned in the valve guide 52. A compression spring 62 is retained between the valve member 56 and a spring retainer 64 which is secured and positioned by the retainer supports 54. The spring retainer 64 is secured in the same manner as used for spring retainer 44.

When the pressure in the fuel tank decreases below a predetermined minimum value, the pressure differential operating on the valve member 56 will cause the valve member 56 to move downward against spring 62 thereby unseating conical portion 58 from valve seat 50 such that atmospheric air can enter the fuel tank, thereby raising the pressure to the minimum predetermined level. The conical skirt 58 is also flexible so that self-cleaning will occur during valve closure.

The valve 24 is a poppet type valve and is capable of providing higher vapor flows than can be obtained with a more conventional diaphragm type valve normally used in sealed fuel tanks. Thus, the valve 24 will permit the escape of a higher volume of gas in a given amount of time should the pressure level within the tank be raised significantly. The valve spring 42 will not undergo significant stresses at these high flow rates. Overstressing might occur with the more conventional diaphragm type valve members.

The embodiments of the invention in which an exclusive property or privilege is claimed are defined as follows:

1. A fuel cap assembly comprising: a handle portion; a threaded closure portion adapted to be threadably inserted in a fuel fill tube for closing of a fuel tank, said threaded closure portion including a pair of valve body structure means each having a valve seat portion, a valve guide portion, and positioning means; and a pair of pressure differential operated valve means for cooperating with said valve body structure means for controlling the respective maximum and minimum pressure conditions in the fuel tank when the fuel cap assembly is in place to close the fill tube, each valve means including a valve member having a flexible conical portion cooperating with respective valve seat portions on said threaded closure portion and a guide stem disposed in respective valve guide portions on said threaded closure portion to facilitate alignment of the conical portion with its valve seat upon valve closure, retainer means positioned by respective positioning means on said threaded closure portion, and spring means disposed between said conical portion and said retainer means for urging said valve means to a closed condition and for permitting the respective valve members to operate to control the maximum and minimum pressure conditons in the fuel tank.

2. A fuel cap assembly comprising: a handle portion; a threaded closure portion adapted to be threadably inserted in a fuel fill tube for closing of a fuel tank, said threaded closure portion including a pair of valve body structure means integrally formed with said threaded closure portion with each valve body structure means having a valve seat portion, a valve guide portion, and positioning means; and a pair of pressure differential operated valve means for cooperating with said valve body structure means for controlling the respective maximum and minimum pressure conditions in the fuel tank when the fuel cap assembly is in place to close the fill tube, each valve means including a valve member having a flexible conical skirt cooperating with respective valve seat portions on said threaded closure portion and a guide stem disposed in respective valve guide portions on said threaded closure portion to facilitate alignment of the conical portion with its valve seat upon valve closure, spring retainer means positioned by and secured to respective positioning means on said threaded closure portion, and spring means disposed between said conical skirt and said retainer means for urging said valve means to a closed condition and for permitting the respective valve members to operate to control the maximum and minimum pressure conditions in the fuel tank, said flexible conical skirt being sufficiently resilient to be deformed by contact with the valve seat portion during valve closing such that wiping of the surface of the conical skirt is achieved.

3. A fuel cap assembly comprising: a handle portion; a threaded closure portion adapted to be threadably inserted in a fuel fill tube for closing of a fuel tank, said threaded closure portion including a pair of valve body structure means each having a valve seat portion, a valve guide portion, and positioning means; and a pair of pressure differential operated valve means for cooperating with said valve body structure means for controlling the respective maximum and minimum pressure conditions in the fuel tank when the fuel cap assembly is in place to close the fill tube, each valve means including a valve member having a flexible conical portion cooperating with respective valve seat portions on said threaded closure portion and a guide stem disposed in respective valve guide portions on said threaded closure portion to facilitate alignment of the conical portion with its valve seat upon valve closure, retainer means positioned by respective positioning means on said threaded closure portion, a cylindrical wall means circumjacent to the outer surface of the conical portion of the valve means controlling the maximum pressure condition and cooperating therewith to form a flow path permitting a large flow volume at the maximum pressure condition, and spring means disposed between each said conical portion and each said retainer means for urging said valve means to a closed condition and for permitting the respective valve members to operate to control the maximum and minimum pressure conditions in the fuel tank.

4. A fuel cap assembly comprising: a handle portion; a threaded closure portion adapted to be threadably inserted in a fuel fill tube for closing of a fuel tank, said threaded closure portion including a pair of valve body structure means integrally formed with said threaded closure structure with each valve body structure means having a valve seat portion, a valve guide portion, and positioning means; and a pair of pressure differential operated valve means for cooperating with said valve body structure means for controlling the respective maximum and minimum pressure conditions in the fuel tank when the fuel cap assembly is in place to close the fill tube, each valve means including a valve member having a flexible conical skirt cooperating with respective valve seat portions on said threaded closure portion and a guide stem disposed in respective valve guide portions on said threaded closure portion to facilitate alignment of the conical portion with its valve seat upon valve closure, spring retainer means positioned by and secured to respective positioning means on said threaded closure portion, spring means disposed between said conical skirt and said retainer means for urging said valve means to a closed condition and for permitting the respective valve members to operate to control the maximum and minimum pressure conditions in the fuel tank, said flexible conical skirt being sufficiently resilient to be deformed by contact with the valve seat portion during valve closing such that wiping of the surface of the conical skirt is achieved, and a cylindrical wall circumjacent to the outer surface of the conical portion of the valve means controlling the maximum pressure condition and cooperating therewith to form a flow path permitting a large flow volume at the maximum pressure condition.

* * * * *